(12) United States Patent
Umeda et al.

(10) Patent No.: US 12,360,226 B2
(45) Date of Patent: Jul. 15, 2025

(54) WIRELESS RANGING SYSTEM

(71) Applicant: Mitsubishi Electric Corporation, Tokyo (JP)

(72) Inventors: Shusaku Umeda, Tokyo (JP); Akinori Taira, Tokyo (JP); Hiroyasu Sano, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 375 days.

(21) Appl. No.: 17/857,454

(22) Filed: Jul. 5, 2022

(65) Prior Publication Data

US 2022/0342064 A1 Oct. 27, 2022

Related U.S. Application Data

(63) Continuation of application No. PCT/JP2020/007523, filed on Feb. 25, 2020.

(51) Int. Cl.
*G01S 13/10* (2006.01)
*G01S 7/292* (2006.01)

(52) U.S. Cl.
CPC .......... *G01S 13/106* (2013.01); *G01S 7/2923* (2013.01); *G01S 13/103* (2013.01)

(58) Field of Classification Search
CPC ..... G01S 13/106; G01S 7/2923; G01S 13/103
See application file for complete search history.

(56) References Cited

U.S. PATENT DOCUMENTS

| | | |
|---|---|---|
| 6,421,371 B1 | 7/2002 | Sourour et al. |
| 7,483,714 B2 | 1/2009 | Tanaka et al. |
| 7,529,551 B2 | 5/2009 | Tanaka et al. |
| (Continued) | | |

FOREIGN PATENT DOCUMENTS

| | | |
|---|---|---|
| JP | 1-96577 A | 4/1989 |
| JP | 2002-530926 A | 9/2002 |
| JP | 3649404 B2 | 5/2005 |
| (Continued) | | |

OTHER PUBLICATIONS

Office Action issued in Japanese Patent Application No. 2020-544865, dated Oct. 20, 2020.

(Continued)

*Primary Examiner* — Patrick C Chen
(74) *Attorney, Agent, or Firm* — Birch, Stewart, Kolasch & Birch, LLP (57) ABSTRACT

A wireless ranging system includes a ranging terminal that transmits a wireless signal including a ranging signal and a communication signal indicating an order of ranging with respect to a first ranging target terminal and a second ranging target terminal, and a first ranging target terminal and a second ranging target terminal that, when receiving the wireless signal, respectively transmits a first response signals and a second response signals consecutively a plurality of times to the ranging terminal. For each time the ranging terminal receives each of the plurality of response signals, the ranging terminal measures an elapsed time from transmission of the wireless signal, and calculates a relative distance between the ranging terminal and the ranging target terminals from a propagation time of each of the plurality of response signals calculated using the elapsed time.

9 Claims, 6 Drawing Sheets

(56) References Cited

U.S. PATENT DOCUMENTS

2008/0291090 A1 11/2008 Vandenameele
2016/0183113 A1* 6/2016 Dua .................... H04W 72/04
370/329

FOREIGN PATENT DOCUMENTS

| JP | 2007-187639 A | | 7/2007 |
|----|---------------|---|--------|
| JP | 2009-5299 A | | 1/2009 |
| JP | 2018-508131 A | | 3/2018 |
| JP | 2019-56636 A | | 4/2019 |
| JP | 2019-65610 A | | 4/2019 |
| JP | 2019065610 A | * | 4/2019 |
| WO | WO 00/30271 A1 | | 5/2000 |

OTHER PUBLICATIONS

Indian Office Action for Indian Application No. 202247037583 dated Oct. 11, 2022, with English translation.
Chinese Office Action and Search Report issued in Chinese Application No. 202080096958.9, mailed on Oct. 31, 2024, with English translation.
Indian Office Action for Indian Application No. 202247037583, dated Apr. 16, 2025, with English translation.

* cited by examiner

WIRELESS RANGING SYSTEM

CROSS-REFERENCE TO RELATED APPLICATION

This application is a continuation application of International Application PCT/JP2020/007523, filed on Feb. 25, 2020, and designating the U.S., the entire contents of which are incorporated herein by reference.

BACKGROUND OF THE INVENTION

1. Field of the Invention

The present disclosure relates to a wireless ranging system, a ranging terminal, a control circuit, a storage medium, and a wireless ranging method for measuring a relative distance between terminals using a radio wave.

2. Description of the Related Art

As a method for measuring a relative distance between terminals using a radio wave, a two-way ranging (TWR) system is garnering attention in which a relative distance between terminals is calculated from a time when a ranging signal is transmitted from a ranging terminal to a ranging target terminal and a time when a response signal in response to the ranging signal is received by the ranging terminal. Patent Literature 1 discloses a wireless ranging technique in which a wireless communication technique using a nanosecond order pulse called ultra-wide band (UWB) is combined with the TWR system.

CITATION LIST

Patent Literature

Patent Literature 1: Japanese Patent No. 3649404

However, according to the above-described conventional technique, because the relative distance is estimated using a propagation time during which a signal makes one round trip between the ranging terminal and the ranging target terminal, there is a problem in that a time required for one ranging is prolonged in proportion to a time taken for a reception process of each terminal, and thus a ranging frequency decreases and ranging accuracy decreases, in some cases. For example, when the ranging frequency decreases, an influence of an error included in one ranging increases, and thus the ranging accuracy decreases. In addition, when the ranging frequency decreases, in a case where the ranging target terminal moves at a high speed, the relative distance to the ranging target terminal has already changed at a time when the relative distance is obtained, and thus the ranging accuracy decreases.

The present disclosure has been made in view of the above, and an object thereof is to obtain a wireless ranging system capable of improving ranging accuracy.

SUMMARY OF THE INVENTION

To solve the above problem and achieve an object, a wireless ranging system according to the present disclosure includes a ranging terminal to transmit a wireless signal including a ranging signal and a communication signal indicating an order of ranging with respect to a first ranging target terminal and a second ranging target terminal; and a first ranging target terminal to, when receiving the wireless signal, transmit a first response signal to the ranging terminal after an elapse of a first offset time based on the order of ranging, and to then transmit the first response signals to the ranging terminal a plurality of times at a first time interval; and a second ranging target terminal to, when receiving the wireless signal, transmit a second response signal to the ranging terminal after an elapse of a second offset time based on the order of ranging, and to then transmit the second response signals to the ranging terminal a plurality of times at a second time interval, wherein for each time the ranging terminal receives each of the plurality of first response signals, the ranging terminal measures an elapsed time from transmission of the ranging signal, calculates a propagation time of each of the first response signals transmitted a plurality of times using a plurality of the elapsed times each of which is time until each of the plurality of first response signals transmitted a plurality of times is received, the first offset time, and the first time interval, and calculates a relative distance between the ranging terminal and the first ranging target terminal for each of the first response signals using a plurality of the propagation times calculated, for each time the ranging terminal receives each of the plurality of second response signals, the ranging terminal measures an elapsed time from transmission of the ranging signal, calculates a propagation time of each of the second response signals transmitted a plurality of times using the plurality of the elapsed times each of which is time until each of the plurality of second response signals transmitted a plurality of times is received, the second offset time, and the second time interval, and calculates a relative distance between the ranging terminal and the second ranging target terminal for each of the second response signals using a plurality of the propagation times calculated, and the first offset time, the first time interval, the second offset time, and the second time interval are set so that the first response signals and the second response signals are alternately receivable by the ranging terminal one by one.

DETAILED DESCRIPTION OF THE PREFERRED EMBODIMENTS

Hereinafter, a wireless ranging system, a ranging terminal, a control circuit, a storage medium, and a wireless ranging method according to each embodiment of the present disclosure will be described in detail with reference to the drawings.

First Embodiment

Figure 1:
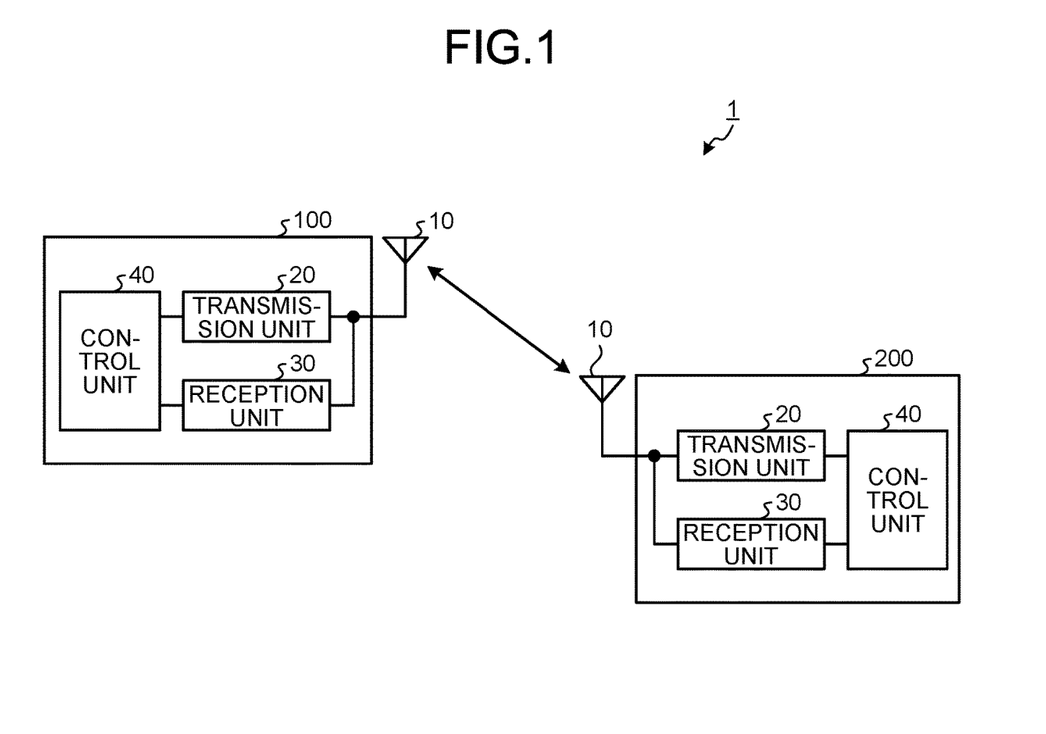
FIG. 1 is a diagram illustrating a configuration of a wireless ranging system according to a first embodiment.

FIG. 1 is a diagram illustrating a configuration of a wireless ranging system 1 according to a first embodiment.

The wireless ranging system 1 includes a ranging terminal 100 and a ranging target terminal 200. The ranging terminal 100 measures a relative distance between the ranging terminal 100 and the ranging target terminal 200 using a wireless signal. FIG. 1 illustrates only the components necessary for describing the technology of the present embodiment, and a general configuration is omitted.

Each of the ranging terminal 100 and the ranging target terminal 200 includes a transmitting/receiving antenna 10 for transmitting and receiving a wireless signal used for ranging, a transmission unit 20 that generates a wireless signal, a reception unit 30 for receiving a wireless signal and processing the signal thus received, and a control unit 40 that controls the transmission unit 20 and the reception unit 30.

The ranging terminal 100 and the ranging target terminal 200 are wireless devices capable of transmitting and receiving a ranging wireless signal. In each of the ranging terminal 100 and the ranging target terminal 200, as wireless devices, the components included therein are similar and denoted by the same reference numerals as described above. However, regarding functions of the components, some functions are in common between the components included in the ranging terminal 100 and those included in the ranging target terminal 200, and some functions are executed only in a case where the components are included in the ranging terminal 100 or a case where the components are included in the ranging target terminal 200.

Figure 2:
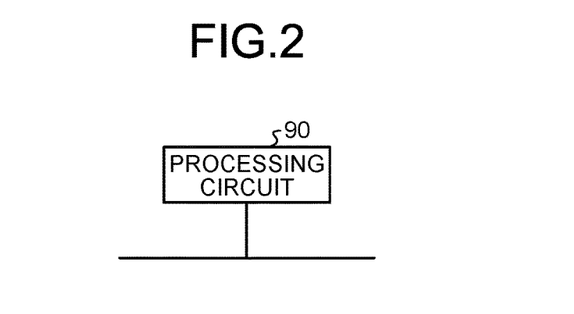
FIG. 2 is a diagram illustrating dedicated hardware for realizing functions of a ranging terminal and a ranging target terminal illustrated in FIG. 1.

The functions of the transmission unit 20, the reception unit 30, and the control unit 40 of each of the ranging terminal 100 and the ranging target terminal 200 may be realized by a dedicated circuit or may be realized by a general-purpose circuit that executes a program. In a case where the functions of the transmission unit 20, the reception unit 30, and the control unit 40 are realized by the dedicated circuit, the ranging terminal 100 and the ranging target terminal 200 each include a processing circuit 90 as illustrated in FIG. 2. FIG. 2 is a diagram illustrating dedicated hardware for realizing the functions of the ranging terminal 100 and the ranging target terminal 200 illustrated in FIG. 1. The processing circuit 90 is a single circuit, a composite circuit, a programmed processor, a parallel programmed processor, an application specific integrated circuit (ASIC), a field programmable gate array (FPGA), or a combination thereof.

Figure 3:
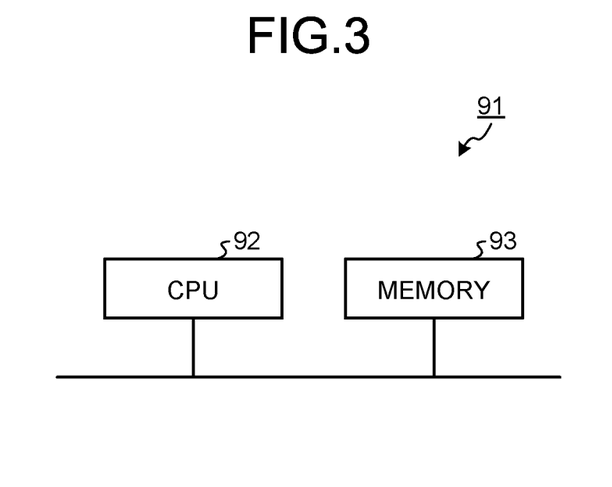
FIG. 3 is a diagram illustrating a configuration of a control circuit for realizing the functions of the ranging terminal and the ranging target terminal illustrated in FIG. 1.

In a case where the above-described processing circuit is realized by the general-purpose circuit, the general-purpose circuit is a control circuit 91 configured as illustrated in FIG. 3, for example. FIG. 3 is a diagram illustrating a configuration of the control circuit 91 for realizing the functions of the ranging terminal 100 and the ranging target terminal 200 illustrated in FIG. 1. As illustrated in FIG. 3, the control circuit 91 includes a central processing unit (CPU) 92 and a memory 93. The CPU 92 is a processor, and also referred to as an arithmetic unit, a microprocessor, a microcomputer, a digital signal processor (DSP), or the like. The memory 93 is, for example, a non-volatile or volatile semiconductor memory such as a random access memory (RAM), a read only memory (ROM), a flash memory, an erasable programmable ROM (EPROM), or an electrically EPROM (EEPROM (registered trademark)), a magnetic disk, a flexible disk, an optical disk, a compact disc, a mini disk, or a digital versatile disk (DVD).

In a case where the above-described processing circuit is realized by the control circuit 91, the processing circuit is realized by the CPU 92 reading and executing one or more programs that correspond to processes of the constituent components and stored in the memory 93. The memory 93 is also used as a temporary memory for each process executed by the CPU 92. The program executed by the CPU 92 may be provided via a communication path or may be provided in a state of being stored in a storage medium. Regarding each of the ranging terminal 100 and the ranging target terminal 200, part of the functions thereof may be realized by using the dedicated circuit, and other part thereof may be realized by using a program and the CPU 92.

Figure 4:
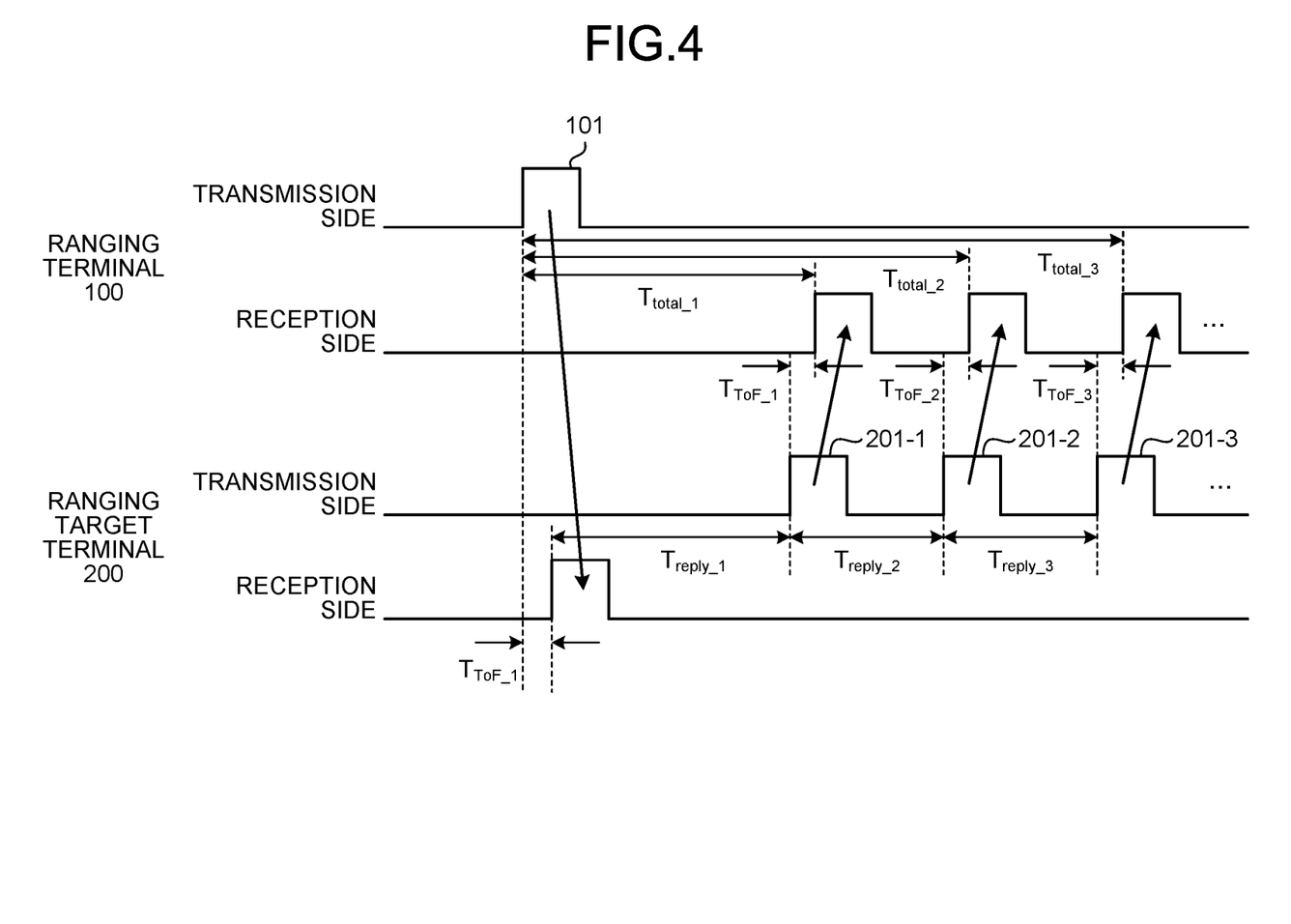
FIG. 4 is a diagram for explaining an operation of the wireless ranging system illustrated in FIG. 1.

FIG. 4 is a diagram for explaining an operation of the wireless ranging system 1 illustrated in FIG. 1. The transmission unit 20 of the ranging terminal 100 transmits a ranging signal 101 to the ranging target terminal 200. The reception unit 30 of the ranging target terminal 200 receives the ranging signal 101. After the reception unit 30 of the ranging target terminal 200 completes a reception process of the ranging signal 101, the control unit 40 instructs the transmission unit 20 to consecutively transmit, to the ranging terminal 100, a plurality of response signals 201-1, 201-2, and 201-3 toward the ranging signal 101.

Every time the reception unit 30 of the ranging terminal 100 receives each of the response signals 201-1, 201-2, and 201-3, the control unit 40 of the ranging terminal 100 measures propagation times $T_{ToF\_1}$, $T_{ToF\_2}$, and $T_{ToF\_3}$ of the respective response signals 201-1, 201-2, and 201-3. A propagation time $T_{ToF\_n}$ is a time from when the ranging target terminal 200 transmits a response signal 201-$n$ to when the ranging terminal 100 receives the response signal 201-$n$. The propagation time TroF_n ($n \geq 2$) is expressed by the following formula (1).

[Formula 1]

$$T_{ToF\_n} = T_{total\_n} - \Sigma nt = T_{reply\_n} - T_{ToF\_1} \qquad (1)$$

Note that in formula (1), $T_{total\_n}$ is an elapsed time in the ranging terminal 100 from the transmission of the ranging signal 101 to the reception of the response signal 201-$n$, and $T_{reply\_n}$ is, in a case of $n \geq 2$, a time from transmission of a response signal 201-($n$-1) to the transmission of the response signal 201-$n$ by the ranging target terminal 200. Similarly to the conventional TWR technique, $T_{ToF\_1}$ can be calculated by using the following formula (2).

[Formula 2]

$$T_{ToF\_1} = \frac{T_{total\_1} - T_{reply\_1}}{2} \qquad (2)$$

Note that $T_{reply\_1}$ is a time from the reception of the ranging signal 101 to the transmission of the response signal 201-1 by the ranging target terminal 200. Because the ranging target terminal 200 transmits the response signal 201-1 immediately after completing the reception process of the ranging signal 101, $T_{reply\_1}$ is equivalent to a reception processing time.

In the case of $n \geq 2$, $T_{reply\_n}$ can be made shorter than the reception processing time. In addition, the ranging terminal 100 can perform a ranging process consecutively a plurality of times without performing the reception process. The control unit 40 calculates the relative distance between the ranging terminal 100 and the ranging target terminal 200 a plurality of times using each of a plurality of propagation times $T_{reply\_n}$ and a communication speed.

As described above, in the wireless ranging system 1 according to the first embodiment, after the ranging terminal 100 transmits the ranging signal 101, the ranging target terminal 200 consecutively transmits, to the ranging terminal 100, the plurality of response signals 201-1, 201-2, and 201-3 in response to the ranging signal 101. Every time the ranging terminal 100 receives each of the plurality of response signals 201-1, 201-2, and 201-3, the ranging terminal 100 measures $T_{reply\_n}$ which is an elapsed time from the transmission of the ranging signal 101 to the reception of each of the plurality of response signals 201-1, 201-2, and 201-3, and calculates the relative distance between the ranging terminal 100 and the ranging target terminal 200 from propagation time $T_{reply\_n}$ of each of the plurality of response signals 201-1, 201-2, and 201-3 calculated from $T_{total\_n}$.

Here, the ranging target terminal 200 transmits the plurality of response signals 201-1, 201-2, and 201-3 with respect to one ranging signal 101. The ranging terminal 100 can calculate the same number of relative distances as the response signals 201-1, 201-2, and 201-3. Therefore, the ranging terminal 100 can improve the ranging frequency as compared with a case where one response signal 201-n is transmitted with respect to one ranging signal 101. Accordingly, even when the ranging target terminal 200 moves at a high speed, the relative distance can be calculated in real time. In addition, the increase of the ranging frequency makes it possible to average results of a plurality of relative distance calculations. Accordingly, the ranging accuracy can be improved.

Note that, although the ranging process using the response signals 201-1, 201-2, and 201-3 in response to one ranging signal 101 has been described above, the ranging target terminal 200 may transmit two response signals 201-n or four or more response signals 201-n with respect to one ranging signal 101.

In addition, the type of each of the ranging terminal 100 and the ranging target terminal 200 is not particularly limited as long as a function of transmitting and receiving a wireless signal is provided. Each of the ranging terminal 100 and the ranging target terminal 200 may be a mobile terminal or may be a fixed terminal.

Second Embodiment

Figure 5:
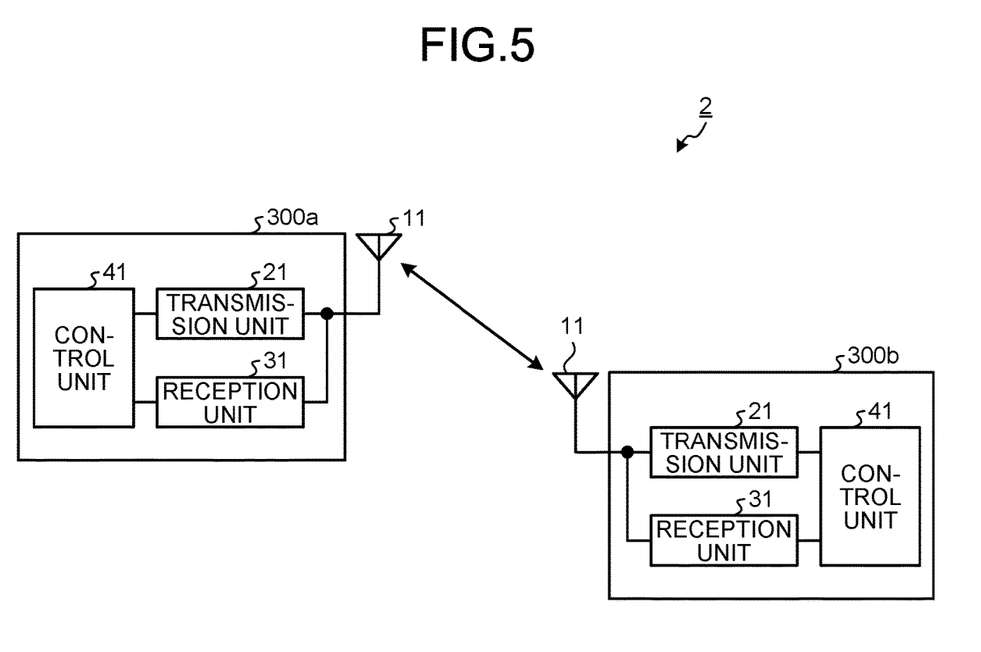
FIG. 5 is a diagram illustrating a configuration of a wireless ranging system according to a second embodiment.

FIG. 5 is a diagram illustrating a configuration of a wireless ranging system 2 according to a second embodiment. The wireless ranging system 2 is a wireless communication system including a communication terminal 300a and a communication terminal 300b. The communication terminal 300a measures a relative distance between the communication terminal 300a and the communication terminal 300b using a wireless signal. FIG. 5 illustrates only the components necessary for describing the technology of the present embodiment, and a general configuration is omitted.

Each of the communication terminals 300a and 300b includes a transmitting/receiving antenna 11 for transmitting and receiving a wireless signal, a transmission unit 21 that generates a wireless signal, a reception unit 31 for receiving a wireless signal and processing the signal thus received, and a control unit 41 that controls the transmission unit 21 and the reception unit 31. The communication terminals 300a and 300b each transmit and receive a wireless signal obtained by adding a communication signal to a ranging wireless signal.

The communication terminal 300a has a communication function in addition to the functions of the ranging terminal 100. The communication terminal 300b has a communication function in addition to the functions of the ranging target terminal 200. The communication terminal 300a can add a communication signal to a ranging signal and transmit the ranging signal. For example, the communication terminal 300a adds, to a ranging signal, a communication signal indicating the number of consecutive transmissions, which is the number of transmissions of response signals to be consecutively performed by the communication terminal 300b, and transmits the ranging signal. In that case, the communication terminal 300b consecutively transmits the response signals in accordance with the number of consecutive transmissions indicated by the communication signal added to the ranging signal. For example, in a case where a communication signal indicating that the number of consecutive transmissions is "5" is added to the ranging signal, the communication terminal 300b performs consecutive five transmissions of response signals with respect to one ranging signal.

The communication terminal 300b can add a communication signal to at least one of a plurality of response signals to be consecutively transmitted and transmit the response signal to the communication terminal 300a. For example, the communication terminal 300b can add, to a response signal, a communication signal indicating a sequence number indicating a transmission order of the response signal and transmit the response signal to the communication terminal 300a. The communication terminal 300a can detect an error with respect to the response signals by using the sequence number.

The hardware configurations of the communication terminals 300a and 300b are similar to those of the ranging terminal 100 and the ranging target terminal 200, and thus, descriptions thereof are omitted here. In addition, an operation of the communication terminal 300a is similar to that of the ranging terminal 100 except that the above-described communication function is provided, and an operation of the communication terminal 300b is similar to that of the ranging target terminal 200 except that the above-described communication function is provided, and thus descriptions thereof are omitted here.

As described above, the wireless ranging system 2 according to the second embodiment can improve the ranging accuracy similarly to the wireless ranging system 1. In addition, because the wireless ranging system 2 has the communication function, it is possible to designate the number of consecutive transmissions of the response signals and to detect an error in the consecution by using the sequence number. As described above, adding the communication function makes it possible to realize a function that cannot be realized only by the ranging function.

Third Embodiment

Figure 6:
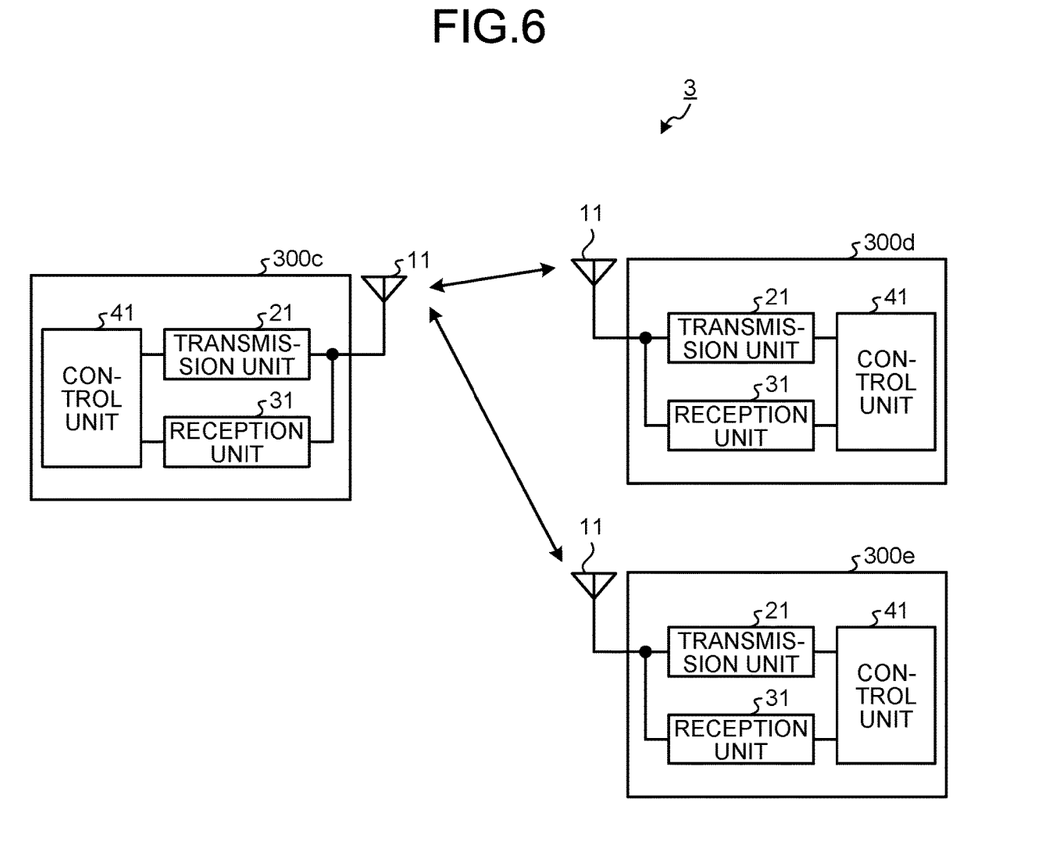
FIG. 6 is a diagram illustrating a configuration of a wireless ranging system according to a third embodiment.

FIG. 6 is a diagram illustrating a configuration of a wireless ranging system 3 according to a third embodiment. The wireless ranging system 3 is a wireless communication system including a communication terminal 300c, a communication terminal 300d, and a communication terminal 300e. The communication terminal 300c measures a relative distance between the communication terminal 300c and the communication terminal 300d and a relative distance between the communication terminal 300c and the communication terminal 300e using a wireless signal. FIG. 6 illustrates only the components necessary for describing the technology of the present embodiment, and a general configuration is omitted.

Because the configuration of each of the communication terminals 300c, 300d, and 300e is similar to that of the communication terminals 300a and 300b, a detailed description thereof is omitted here.

The communication terminal 300c has a communication function in addition to the functions of the ranging terminal 100. Each of the communication terminals 300d and 300e has a communication function in addition to the functions of the ranging target terminal 200. The communication terminal 300c can measure relative distances to the plurality of communication terminals 300d and 300e.

Figure 7:
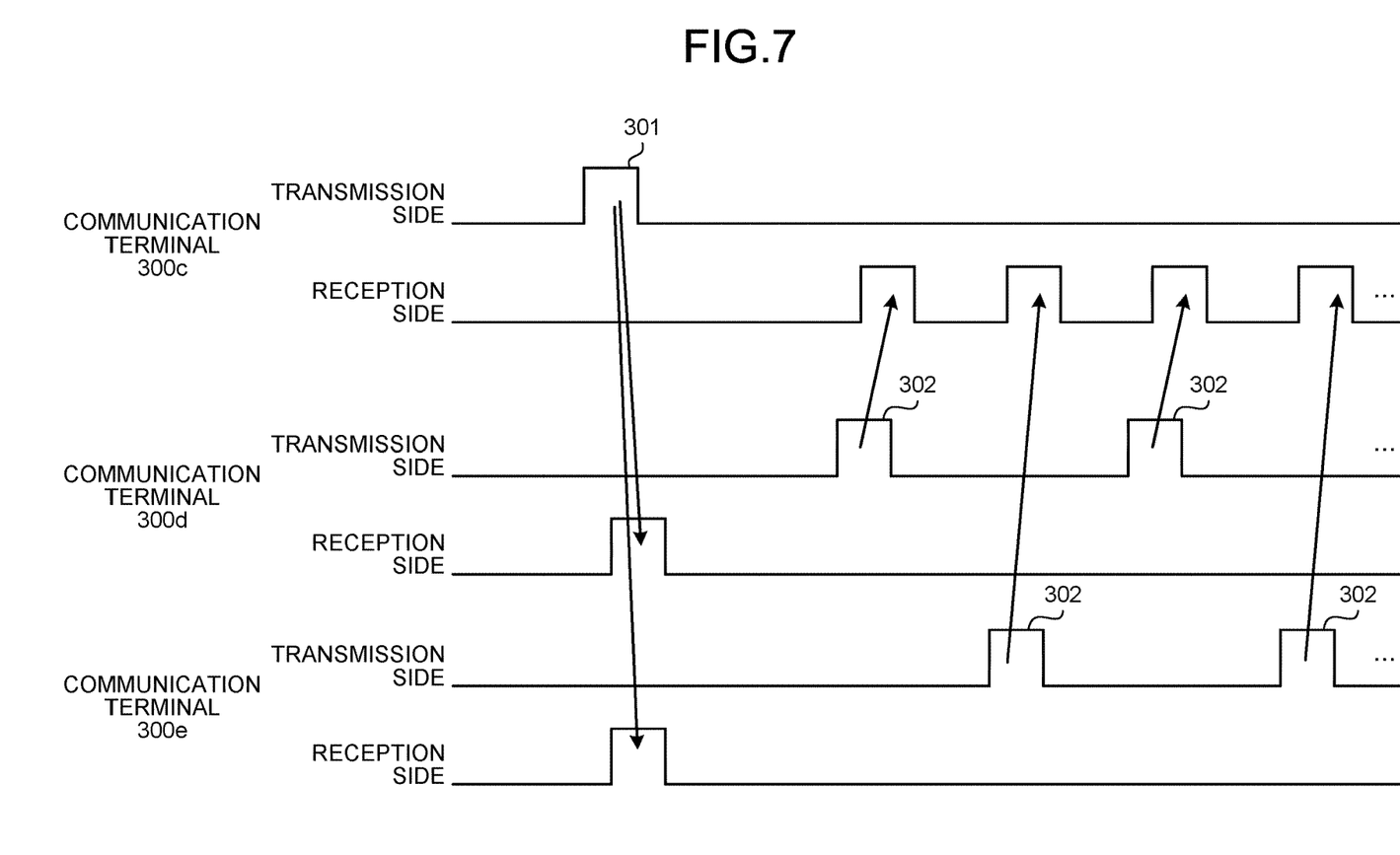
FIG. 7 is a diagram for explaining an operation of the wireless ranging system illustrated in FIG. 6.

FIG. 7 is a diagram for explaining an operation of the wireless ranging system 3 illustrated in FIG. 6. The transmission unit 21 of the communication terminal 300c transmits a wireless signal 301 to each of the plurality of communication terminals 300d and 300e. At that time, the wireless signal 301 includes a ranging signal and a communication signal. For example, the communication signal indicates the plurality of communication terminals 300d and 300e as ranging targets, and the order of ranging with respect to the plurality of communication terminals 300d and 300e.

When receiving the wireless signal 301, the communication terminal 300d checks the ranging targets indicated by the communication signal included in the wireless signal 301, and determines whether the communication terminal 300d is included in the ranging targets. If included in the ranging targets, the communication terminal 300d further checks the order of ranging of the communication terminal 300d indicated by the communication signal included in the wireless signal 301. Similarly, when receiving the wireless signal 301, the communication terminal 300e checks the ranging targets indicated by the communication signal included in the wireless signal 301, and determines whether the communication terminal 300e is included in the ranging targets. If included in the ranging targets, the communication terminal 300e further checks the order of ranging of the communication terminal 300e indicated by the communication signal included in the wireless signal 301.

The communication terminal 300d transmits response signals 302 in response to the ranging signal included in the wireless signal 301 to the communication terminal 300c consecutively a plurality of times in accordance with the checked ranging order. The communication terminal 300e transmits the response signals 302 in response to the ranging signal included in the wireless signal 301 to the communication terminal 300c consecutively a plurality of times in accordance with the checked ranging order. Specifically, the communication terminal 300d the ranging order of which is "1"st transmits the response signal 302 immediately after completing the reception process as usual, and thereafter, transmits the response signal 302 at an regular interval. The communication terminal 300e the ranging order of which is "2"nd transmits the response signal 302 after the elapse of a predetermined offset time from the completion of the reception process of the wireless signal 301 so that the transmission signal does not collide with that from the communication terminal 300d, and thereafter, transmits the response signal 302 at an regular interval.

Every time the communication terminal 300c receives each of the plurality of response signals 302, the communication terminal 300c can measure an elapsed time from the transmission of the wireless signal 301, and calculate the relative distance between the communication terminal 300c and the communication terminal 300d and the relative distance between the communication terminal 300c and the communication terminal 300e from the propagation time of each of the plurality of response signals 302 calculated using the elapsed times. The method of calculating the relative distance is similar to that in the first embodiment, and thus a detailed description thereof is omitted here.

Note that, in the above description, the communication terminal 300c sets the two communication terminals 300d and 300e as ranging targets, but the present embodiment is not limited to such an example. For example, the communication terminal 300c may set three or more communication terminals as ranging targets.

As described above, the wireless ranging system 3 according to the third embodiment can improve the ranging accuracy similarly to the wireless ranging system 1. In addition, in the wireless ranging system 3, one communication terminal 300c calculates the relative distance between the communication terminal 300c and each of the plurality of communication terminals 300d and 300e. Even when there are a plurality of ranging targets, it is possible to notify each of the plurality of communication terminals 300d and 300e of the ranging order using the communication function. Therefore, each of the plurality of communication terminals 300d and 300e as ranging targets can adjust a transmission timing so that the response signal 302 transmitted by the communication terminal 300d and the response signal 302 transmitted by the communication terminal 300e do not collide with each other.

The wireless ranging system according to the present disclosure achieves an effect that it is possible to improve ranging accuracy.

The configurations described in the above embodiments are merely examples, and can be combined with other known technology, the embodiments can be combined with each other, and part of the configurations can be omitted or modified without departing from the gist thereof.

What is claimed is:

1. A wireless ranging system comprising:
a ranging terminal to transmit a wireless signal including a ranging signal and a communication signal, the communication signal indicating an order of ranging with respect to a first ranging target terminal and a second ranging target terminal;
the first ranging target terminal to, when receiving the wireless signal, transmit a first response signal to the ranging terminal after an elapse of a first offset time based on the order of ranging, and to then transmit the first response signals to the ranging terminal a plurality of times at a first time interval; and
the second ranging target terminal to, when receiving the wireless signal, transmit a second response signal to the ranging terminal after an elapse of a second offset time based on the order of ranging, and to then transmit the second response signals to the ranging terminal a plurality of times at a second time interval, wherein
for each time the ranging terminal receives each of the plurality of first response signals,
the ranging terminal measures an elapsed time from transmission of the ranging signal,
the ranging terminal calculates a propagation time of each of the plurality of first response signals using:
a plurality of the elapsed times, each of the plurality of elapsed times is a time until one of the plurality of first response signals is received;
the first offset time; and
the first time interval, and
the ranging terminal calculates a relative distance between the ranging terminal and the first ranging target terminal for each of the first response signals using the propagation time of each of the plurality of first response signals,
for each time the ranging terminal receives each of the plurality of second response signals, the ranging terminal measures an elapsed time from transmission of the ranging signal, the ranging terminal calculates a propagation time of each of the plurality of second response signals using:

the plurality of the elapsed times, each of the plurality of elapsed times is a time until one of the plurality of second response signals is received;

the second offset time;

and the second time interval, and the ranging terminal calculates a relative distance between the ranging terminal and the second ranging target terminal for each of the second response signals using the propagation time of each of the plurality of second response signals, and the first offset time, the first time interval, the second offset time, and the second time interval are set so that the first response signals and the second response signals are alternately receivable by the ranging terminal one by one such that a first of the first response signals and a first of the second response signals are received before a second of the first response signals is received, the first of the first response signals and the first of the second response signals not overlapping in time.

2. The wireless ranging system according to claim 1, wherein the communication signal includes a first number of consecutive transmissions that is a number of transmissions of the first response signals to be performed by the first ranging target terminal, and a second number of consecutive transmissions that is a number of transmissions of the second response signals to be consecutively performed by the second ranging target terminal.

3. The wireless ranging system according to claim 2, wherein the first ranging target terminal transmits the first response signals in accordance with the number of consecutive transmissions, and the second ranging target terminal transmits the second response signals in accordance with the second number of consecutive transmissions.

4. The wireless ranging system according to claim 3, wherein the first ranging target terminal adds, to each of the first response signals, a sequence number indicating a transmission order of the first response signal, and the second ranging target terminal adds, to each of the second response signals, a sequence number indicating a transmission order of the second response signal.

5. The wireless ranging system according to claim 4, wherein the ranging terminal detects an error with respect to the first response signals and the second response signals by using the sequence number.

6. The wireless ranging system according to claim 2, wherein the first ranging target terminal adds, to each of the first response signals, a sequence number indicating a transmission order of the first response signal, and the second ranging target terminal adds, to each of the second response signals, a sequence number indicating a transmission order of the second response signal.

7. The wireless ranging system according to claim 6, wherein the ranging terminal detects an error with respect to the first response signals and the second response signals by using the sequence number.

8. The wireless ranging system according to claim 1, wherein the first ranging target terminal adds, to each of the first response signals, a sequence number indicating a transmission order of the first response signal, and the second ranging target terminal adds, to each of the second response signals, a sequence number indicating a transmission order of the second response signal.

9. The wireless ranging system according to claim 8, wherein the ranging terminal detects an error with respect to the first response signals and the second response signals by using the sequence number.

* * * * *